United States Patent [19]

Weigand, Jr.

[11] Patent Number: 4,558,200

[45] Date of Patent: Dec. 10, 1985

[54] ELECTRICAL LEAD TERMINATION

[75] Inventor: Charles H. Weigand, Jr., Savanna, Ill.

[73] Assignee: Eaton Corporation, Cleveland, Ohio

[21] Appl. No.: 522,444

[22] Filed: Aug. 12, 1983

[51] Int. Cl.$^4$ .............................................. B23K 1/12
[52] U.S. Cl. ............................. 219/85 CM; 219/56.22
[58] Field of Search .......... 219/85 CM, 85 CA, 85 R, 219/85 A, 85 M, 85 E, 56.1, 56.22; 228/220

[56] References Cited

U.S. PATENT DOCUMENTS

| | | | |
|---|---|---|---|
| 2,757,324 | 7/1956 | Pearson | 219/85 CA |
| 3,246,395 | 4/1966 | Galmiche | 228/220 |
| 4,211,913 | 7/1980 | Camardella | 219/56.22 |

FOREIGN PATENT DOCUMENTS

| | | | |
|---|---|---|---|
| 41430 | 12/1981 | European Pat. Off. | 219/85 A |
| 23465 | 11/1963 | Japan | 219/85 CM |

*Primary Examiner*—C. L. Albritton
*Assistant Examiner*—Catherine M. Sigda
*Attorney, Agent, or Firm*—C. H. Grace; R. A. Johnston

[57] ABSTRACT

A method of attaching fine coil wire ends 22, 24 to terminal connectors 16, 18 wherein the terminals are rapidly heated into the red zone by common current flow therethrough from contact electrodes 26, 28 in the presence of a gaseous purge comprising a mixture of hydrogen balance argon, nitrogen, or helium while low melting temperature solder 84 is flowed onto the heated terminal for wire attachment. The gaseous purge from a nozzle 80 is maintained until the terminal has cooled sufficiently to prevent rapid atmosphere oxidation thereof.

6 Claims, 1 Drawing Figure

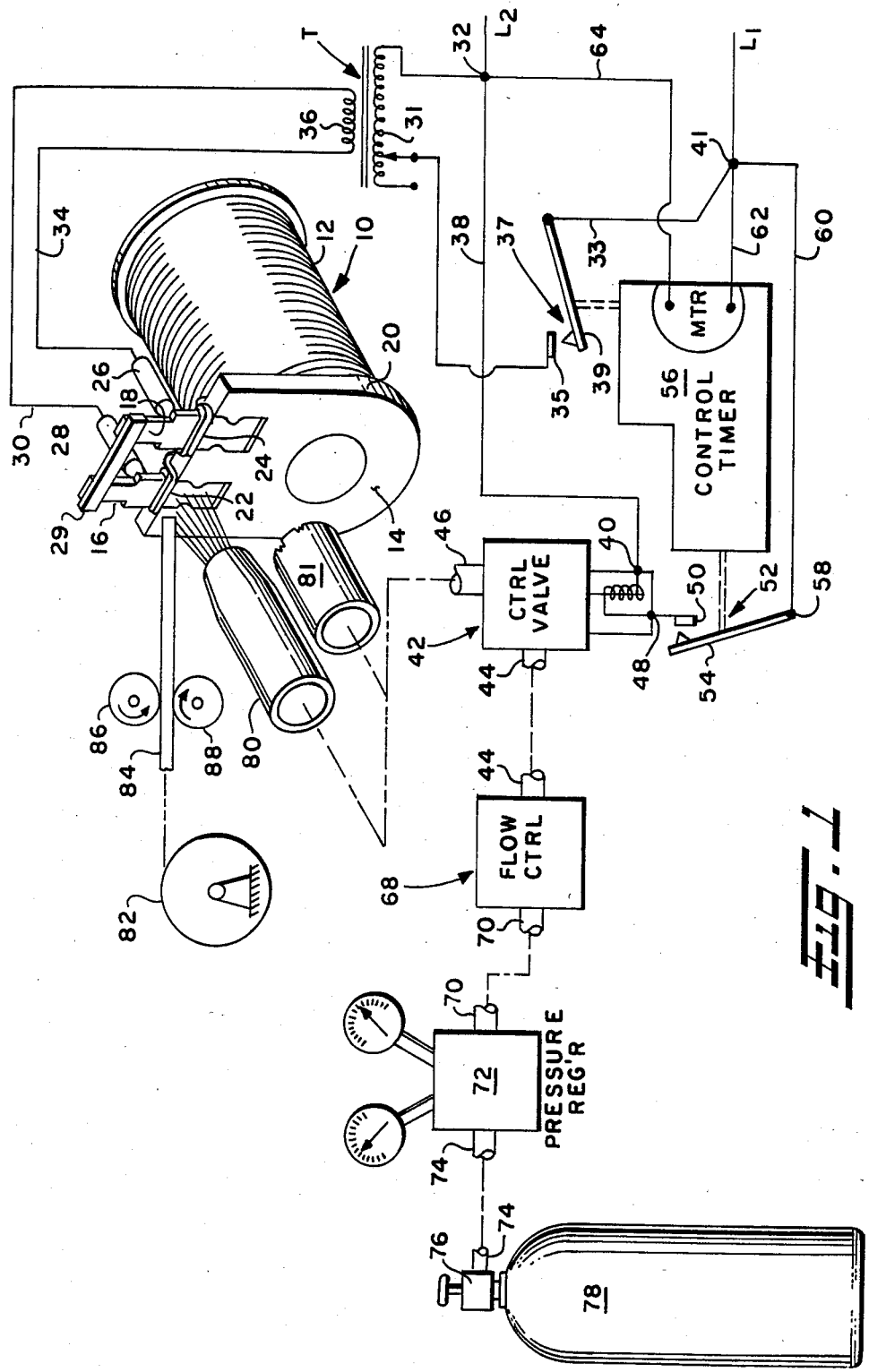

ELECTRICAL LEAD TERMINATION

BACKGROUND OF THE INVENTION

The present invention relates to the manufacturer of solenoid coils for electrically actuated control devices such as water inlet valves employed for use on household washing machines and dishwashers. Valves of this type generally are activated by an electrical programmer timer which is capable of handling only a very limited current flow to the electrical valve actuator. The limited power handling capability of the programmer timer requires that the valve actuator provide the required mechancial actuating force from a minimum of current flow to the solenoid. This necessarily has resulted in solenoid coils which have been wound from many hundreds of turns of extremely fine single conductor wire.

In the manufacture of fine wire electrical valve actuating solenoids in high volume or mass production, it has proven difficult to provide a connection between the ends of the coil conductor and the electrical attachment terminals provided for attachment to the appliance wiring harness. It has been found particularly troublesome to provide a way or means of attaching the coil wire ends to the terminals in the very short time, on the order of a few seconds, allotted for operations in a high speed coil manufacturing process.

The fine wire conductor has been found to be difficult to manipulate automatically by non-human means since the breaking strength of the fine wire is quite low. The fine wire does not lend itself to devices and operations which exert any substantial tension on the wire. This has proven particularly troublesome where the fine coil wire is wound at a rapid rate about a connector terminal for termination thereon. The fine wire conductor is not capable of withstanding sufficient tension to permit lead termination safely by tying or other friction-dependent techniques for providing metal-to-metal contact of the wire with a connector terminal. It has thus been found desireable to provide a soldered connection for the wire termination onto the connector terminal in order to provide the least amount of electrical resistance to current flow between the terminal and the coil wire.

The accomplishment of the soldering of a fine coil wire to a connector terminal in the very short time allotted on a high speed production basis, has generated a need for a technique of soldering the wire-terminal connection very rapidly on an easily controlled and repeatable basis.

In providing a high-speed, or short-cycle duration, soldering process for fine wire coil leads to a connecting terminal a very rapid heating of the terminal and wire has been required to provide a rapid flowing of the solder onto the joint for effecting adequate electrical connection there-between. The rapid heating of the terminal has resulted in the terminal and wire lead reaching a temperature substantially in excess of the melting point of the solder. In fact, it has been found that the terminal will be heated to nearly the red zone and consequently subjected to rapid and undesired oxidation of the terminal surface. This undesired oxidation has prevented the solder from adequate adhesion to the surface of the terminal and has resulted in a poor solder connection.

It has thus been desired to find a way or means of rapidly soldering the ends of a fine wire solenoid coil to connector terminals in a manner providing a good solder joint and yet maintaining the soldering operations cycle of such a short time duration as to enable high-speed production of the completed coil assembly.

SUMMARY OF THE INVENTION

The present invention provides a solution to the above described problem of terminating fine wire coil conductor leads onto electrical connector terminals by low temperature soldered joint and performing this operation on a high-speed production basis with repeatability and adequate control of the quality of the solder joint.

The present invention employs electrodes brought into contact with a terminal for flowing an electrical current therethrough for effecting rapid heating of the terminal. The current flow required to effect the desired rapid heating causes the terminal temperature to rise substantially above the melting point of the solder and generally into the red-heat zone. During heating the terminal is maintained in a purge of a gaseous mixture comprising hydrogen, balance inert gas, while the terminal is heated and solder is flowed onto the wire-terminal connection. The gaseous purge is maintained on the terminal while the electrodes are removed and the terminal permitted to cool below the temperature range effecting rapid oxidation on the surface thereof. While the terminal is at the elevated temperature, solder is brought into contact with the heated terminal and permitted to flow thereon in a substantially oxygen-free atmosphere. The method of the present invention thus permits the terminal and coil wire termination to be heated rapidly and the solder flowed quickly unto the heated joint without concern that the high temperature of the terminal will cause rapid oxidation and inadequate bonding of the solder.

The present invention employs a gaseous purge of the atmosphere surrounding the heated terminal comprising a mixture of a significant portion of hydrogen, balance selected from the group consisting of nitrogen, argon or helium. The mixture contains hydrogen is present in amounts fof 5-15%.

In the present invention, lead wire electrical terminals are rapidly heated in a purged atmosphere by contact electrodes which effect a resistine current flow through the terminal for a short duration of time, the current flow being sufficient to heat the terminal to a temperature substantially above the melting point of the solder which is flowed thereon.

BRIEF DESCRIPTION OF THE DRAWINGS

FIG. 1 is a pictorial schematic of the gas flow and electrical circuit employed for practicing the method of the present invention.

DETAILED DESCRIPTION

Referring now to FIG. 1, an electrical coil assembly indicated generally at 10 is composed of a plurality of many turns 12 of fine wire wound on a bobbin 14, which has a pair of electical terminals 16, 18 received in one end flange 20 thereof and extending therefrom in a generally radial direction for electrical attachment thereto.

The end leads 22, 24 of the coil conductor wire are attached respectively to terminals 16, 18 in a manner suitable for low temperature soldering thereto.

A pair of electrical contact electrodes 26, 28 are employed for heating the terminals simultaneously, as illustrated in FIG. 1 by contact with common sides of terminals 16 and 18 respectively. Electrodes 26, 28 are connected via leads 30, 34 to the secondary winding 36 of a transformer indicated generally at "T". An electrode comprising bar 29 shunts between terminals 16, 18, for completing a circuit such that a common current flows through terminals 16, 18.

The primary winding 31 of transformer "T" has suitable taps and the tapped side is connected to stationary contact 35 of a switch indicated generally at 37; and, the other lead of the primary winding 31 is connected to junction 32 which is connected to side $L_2$ of the power line.

Switch 37 has the moveable contact arm 39 thereof connected via lead 33 to junction 41 connected to opposite side $L_1$ of the power line. Junction 32 is also connected via lead 38 to one power lead terminal 40 of an electrically operating control valve, indicated generally at 42, which has an inlet conduit connection 44 and an outlet conduit connection 46.

In the presently preferred practice, shunt bar 29 contacts the terminals 16, 18 on the side opposite electrodes 26, 28 in a region adjacent the wire lead wrap. This arrangement utilizes a portion of the length of the terminals for resistive heating by the current flowing therethrough.

The shunt bar 29 is offset along the terminals 16, 18 from electrodes 26, 28 by a distance adjustable to permit current flow through terminals 16, 18 sufficient to provide the desired heating of the wire connections at 22, 24.

The second power connection terminal 48 of control valve 42 is connected to the stationary contact 50 of a line power switch, indicated generally at 52, which has a moveable contact member 54 operatively connected to a control timer 56 as indicated by the double dashed line in FIG. 1. The moveable switch member 54 is connected via terminal 58 and lead 60 to power line junction 41. The control timer 56 has one terminal of its timing motor, indicated as "MTR" connected to the power line via lead 62 through junction 41 and the remaining motor terminal connected via lead 64 through junction 32 to the opposite side of the power line.

The moveable contact-arm 39 of switch 37 is also mechanically connected to timer 56, for movement thereby as indicated by double dashed line in FIG. 1.

The inlet of control valve 42 is connected via conduit 44 to the outlet of a flow control device, indicated generally at 68, which has the inlet thereof connected via conduit 70 to the outlet of a pressure regulator. 72 which has the inlet thereof connected via conduit 74 to the outlet of a high pressure shutoff valve 76. Valve 76 is connected to a reservoir 78 containing a pressurized gaseous media which will be hereinafter described in greater detail.

The outlet conduit 46 of control valve 42 is connected to a flow discharge nozzles shown typically at 80, 81 which are disposed to discharge the gaseous media directly onto the terminal in the region of wire termination 22 attachment thereto. Although only a single discharge nozzle is shown fully in FIG. 1 for clarity, a companion, or twin, nozzle 81, shown truncated, is employed for discharge onto lead termination 24 of terminal 18, and the companion nozzle 81 is also connected to the outlet 46 of valve 42.

A spool 82 of low melting point solder is disposed for potential feed of a continuous wire 84 of solder which is fed through a pair of powered rollers 86, 88 for feeding solder onto the heated terminal.

In the presently preferred practice of the invention a reservoir 78 is provided, charged with gaseous media which comprises a mixture of 5-15% hydrogen balanced selected from a group consisting of argon, helium or nitrogen. The nozzle 80 and the companion nozzle 81 preferably has a $\frac{3}{8}$ inch (9.5 millimeters) diameter opening. The flow regulator 68 is set to provide a total flow to valve 42 of 1.0-2.0 cubic feet ($ft^3$) per hour and the flow is preferably maintained at a rate of 1.0-1.5 feet ($ft^3$) per hour. The invention is presently employed for soldering coils having a number 38 gage wire (0.06 inch or 0.15 millimeter diameter) or finer.

In operation, the electrodes 26, 28 and shunt bar 29 are applied to the terminal, as shown in the drawing. Timer 56 then closes switch 37 and current is permitted to flow through the terminal for a time period not greater than two seconds which effects heating of the terminal in a range of 450°-750° centigrade. It will be understood that the amount of current may be varied depending upon the mass of the terminal to be heated. In the present practice of the invention, a current and voltage combination resulting in 1000 watts of power is chosen. In the presently preferred practice, this power setting has been found satisfactory for terminals having a thickness of 0.032 inches (0.81 mm) and a width of 0.25 inches (6.35 mm) with the current flowing for a period of 1.0 seconds.

While the terminals are heated, the solder wire 84 is brought into contact with the termination 22, 24 and the solder is permitted to flow onto the connection. The flow of gaseous mixture is begun before and is maintained during the period of heating of the terminal and slightly thereafter until the terminal cools to a temperature below the oxidation point. In the presently preferred practice, the gas purge is initiated 0.5 seconds prior to onset of current flow, is maintained during current flow and continues for 0.5 seconds after termination of current flow.

Although the terminals 16, 18 are resistively heated by current flow therethrough, it will be understood that other heating techniques may be employed as for example induction heating or heating by lasers.

The present invention provides a unique way of rapidly providing a solder connection of a fine wire coil connector onto an electrical terminal in high volume production where rapid heating is required for soldering, and the solder connection reaches an elevated temperature in the range sufficient to cause oxidation. The present method provides a gaseous atmospheric purge of the solder connection during the rapid heating to prevent oxidation of the terminal and failure of the solder connection.

It will be apparent to those having ordinary skill in the art that the invention as described hereinabove is capable of modification and variation and is limited only by the following claims:

What is claimed:
1. A method of making circuit terminations comprising of steps of:
   (a) providing a metal connecting terminal for electrical lead connection thereto;
   (b) heating said terminal to a temperature above 450° C.;

(c) flowing a gaseous mixture comprising 5–15% hydrogen, balance selected from the group consisting of argon, nitrogen or helium over said heated terminal; and, (d) applying a solder having a melting point not greater than 350° C. to said terminal in the region of said lead connection and permitting said solder to melt in the atmosphere of said gaseous mixture.

2. The method defined in claim 1 where in the step of heating comprises contacting said terminal with a pair of electrodes and flowing a current through said terminal;

3. The method defined in claim 1 wherein said step of applying solder comprises progressively advancing a continuous wire strip of solder.

4. The method defined in claim 1 further comprising the step of maintaining said flow of gaseous mixture until said solder cools to a temperature below the oxidation point of the terminal;

5. The method defined in claim 1 where in said step of applying solder includes feeding a connection wire of solder against said connections 6. A method of making coil lead terminations comprising the steps of:

(a) providing a pair of spaced connecting terminals for connection thereto;

(b) wrapping a coil lead about portions of each terminal;

(c) flowing a common electrical current through said terminals for heating said terminals to an elevated temperature in the range sufficient to cause rapid oxidation; and (d) applying solder to said pair of heated terminals while at said elevated temperature; and, (e) flowing a gaseous mixture comprising 5–15% hydrogen, balance selected from the group consisting of argon, nitrogen or helium over said heated terminals.

* * * * *